Jan. 3, 1939.　　　　　　G. V. WOODLING　　　　　2,142,593
AIR CONDITIONING
Filed Dec. 24, 1932　　　　5 Sheets-Sheet 1

WITNESS　　　　　　　　　　　　　　　　　　　　　　　INVENTOR.

Jan. 3, 1939.   G. V. WOODLING   2,142,593
AIR CONDITIONING
Filed Dec. 24, 1932   5 Sheets-Sheet 2

INVENTOR.
George V. Woodling

WITNESS

Jan. 3, 1939.                G. V. WOODLING                2,142,593
                              AIR CONDITIONING
                            Filed Dec. 24, 1932            5 Sheets-Sheet 3

WITNESS

INVENTOR.
George V. Woodling

Patented Jan. 3, 1939

2,142,593

UNITED STATES PATENT OFFICE 2,142,593

AIR CONDITIONING

George V. Woodling, Cleveland, Ohio, assignor to General Motors Corporation, a corporation of Delaware Application December 24, 1932, Serial No. 648,822

21 Claims. (Cl. 236—1)

My invention relates, in general, to air-conditioning, and more particularly to means for measuring and regulating the condition of the air to give the maximum degree of comfort.

The subject matter of the present application for Letters Patent is related to the subject matter covered in my application for Letters Patent Serial No. 645,570, filed December 3, 1932, entitled "Air conditioning", the latter being a division of my pending application for Letters Patent, Serial 606,837, filed April 22, 1932, entitled, "Measuring and regulating devices."

The human comfort or discomfort, as regards feeling of warmth, depends largely upon the body temperature, and, therefore, upon the relation between the rate of production and dissipation of heat.

By the process of metabolism, heat is constantly generated within the body. Accordingly, this heat must be eliminated from the surface of the body and from the respiratory tract by radiation, convection and evaporation. Hence, to maintain a constant body temperature, the heat loss of the body must equal the heat produced. It is, therefore, apparent that any reduction in the elimination of heat from the body must result in a rise in the temperature and a corresponding feeling of discomfort. As the temperature of the air and surrounding objects rise, the loss of heat by convection and radiation decreases. When the air temperature reaches that of the body, the loss by radiation and convection ceases. Finally, as the air temperature exceeds that of the body, heat is transferred from the air to the body. As the temperature of the air rises and heat loss by radiation and convection decreases, the body endeavors to maintain temperature equilibrium by making available more perspiration, thus resulting in a greater heat loss by evaporation.

From the foregoing, one notes that there must necessarily exist certain combinations of temperatures, humidities, and air motions, which produce the same total heat loss by radiation, convection, and evaporation; and, therefore, the same feeling of comfort or discomfort. Therefore, the comfort or discomfort of the human body depends not only upon the temperature of the surrounding air as registered by a dry-bulb thermometer, but also upon the temperature as indicated by the wet-bulb thermometer, together with the air motion.

The combinations of temperature, humidity, and air movement which produce the same feeling of warmth are called "thermo-equivalent conditions" or, more generally, "effective temperatures" or "comfort indexes". Elaborate experiments conducted by the Research Laboratory of the United States Bureau of Mines, Pittsburgh, Pennsylvania, and published in the Transactions of the American Society of Heating and Ventilating Engineers from 1923 to the present date, by F. C. Haughten and C. P. Yaglou, show that this newly-developed scale of thermo-equivalent conditions, or effective temperatures not only indicates the sensation of warmth, but also determines the physiological effects on the body induced by heat and cold.

The effective temperature or the comfort index being an experimentally determined scale, unlike the dry-bulb and wet-bulb temperature scales, is a true measure or index of a person's feeling of warmth in all combinations of temperature, humidity and air movements. In other words, for any one given effective temperature, a person feels the same degree of warmth or coldness regardless of the dry-bulb temperature, the wet-bulb temperature, and velocity of the air required to produce that particular effective temperature.

Therefore, an object of my invention is to provide for giving a measurement of the human comfort.

Another object of my invention is to provide for giving a measurement of the human comfort in terms of the combination of the dry-bulb temperature, the relative humidity, and the air velocity.

A further object of my invention is to so modify the measurements of the dry bulb temperature as to correct for changes in the moisture and the air velocity, and thereby effect a modified measurement that is a true index of a person's feeling of comfort.

A still further object of my invention is to translate three movements into a single resultant movement.

Another object of my invention is the provision of a comfort regulating device which may be adjustably and automatically set to give the maximum degree of comfort.

A further object of my invention is the provision of a dual comfort regulating device; that is to say, it is adjustably adapted to regulate the heating apparatus in the winter time and the cooling equipment in the summer time.

It is also an object of my invention to so arrange the electrical contact members of the dual comfort regulating device that the action of the heating apparatus or the cooling equipment is initiated when the contact members are closed, and that the action of the heating apparatus or the cooling equipment is arrested when the contact members are open.

Another object of my invention is to so regulate the heating apparatus or the cooling equipment that the comfort index maintained by the heating apparatus or the cooling equipment coincides with the setting of the comfort index as indicated on the comfort regulating device.

Another object of my invention is to provide for so regulating the human comfort that, for any change in the dry-bulb temperature, the moisture, or the air velocity, which results in a change in the human comfort, a correction is made in the dry-bulb temperature, in the moisture, or in the air motion, either singly or in combination, to off-set the said initial change in the human comfort caused by the change in dry-bulb temperature, the moisture, or the air motion, A further object of my invention is to provide for giving a subtra-hend based upon the condition of the air and for subtracting this subtra-hend value from the dry-bulb temperature to give measurement of the human comfort.

Another object of my invention is to provide for operating both a fan and the heating apparatus when the human comfort index is less than a predetermined cold value; for operating the fan only when the human comfort index is more than the said predetermined cold value and less than a second higher predetermined value, and for operating neither the fan nor the heating apparatus when the human comfort index is more than the second higher predetermined value; and to provide for operating both the fan and the cooling equipment when the human comfort index is more than a predetermined warm value; for operating the fan only when the human comfort index is less than the said predetermined warm value and more than a second lower predetermined value, and for operating neither the fan nor the cooling equipment when the human comfort index is less than the second lower predetermined value.

Another object of my invention is to provide for setting the air motion off on the comfort regulating device to correspond either to the prevailing natural air motion or to that created by the fan.

A still further object of my invention is to provide for regulating the human comfort in a building in accordance with either the effective temperature or the dry-bulb temperature of the atmosphere surrounding the building.

Another object of my invention is to regulate the setting of the comfort regulating device in accordance with the comfort index of the atmosphere surrounding the building.

Other objects and a fuller understanding of my invention may be had by referring to the following specification, taken in connection with the accompanying drawings, in which.

Figure 1:
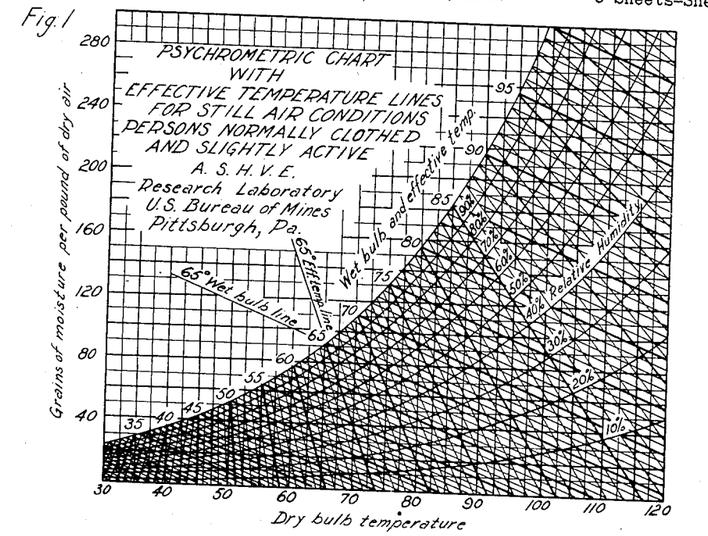
Figure 1 is a psychrometric chart with effective temperature lines for still air (persons normally clothed and slightly active)
Figure 2:
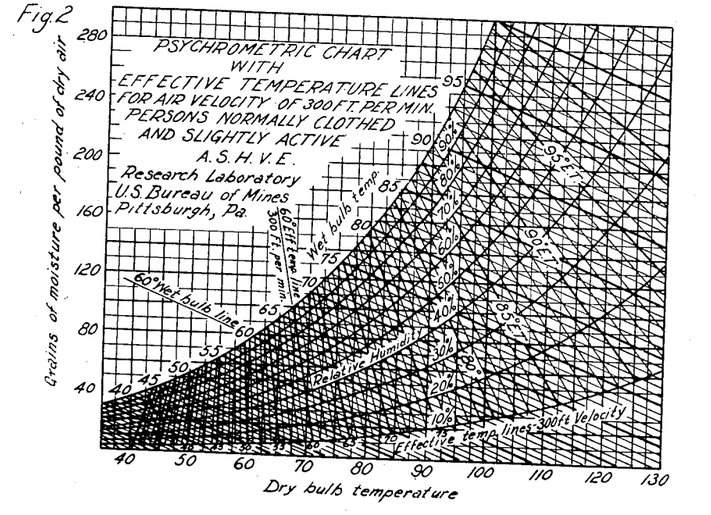
Figure 2 is a psychrometric chart with effective temperature lines for an air velocity of 300 feet per minute (persons normally clothed and slightly active)

With reference to the two psychrometric charts of Figures 1 and 2, the dry-bulb temperature is plotted as abscissae and the grains of moisture per pound of dry air as ordinates. The maximum moisture which the air can hold at various temperatures gives the saturation, or 100 per cent relative humidity curve. Relative humidities between zero and 100 per cent are given by a series of curved lines similar to the saturation curve. The wet-bulb temperatures for all atmospheric conditions are given by a series of nearly parallel oblique lines. Effective temperature is given by a series of oblique, but not parallel, lines which approach being parallel to the wet-bulb temperature lines at high temperatures and humidities, and to the dry-bulb temperature lines at low temperatures. In the psychrometric chart of Figure 1, which is for still air, the effective temperature line is perpendicular and coincides with the dry-bulb temperature line at 46°. In Figure 2, which is for air moving at the rate of 300 feet per minute, the effective temperature line is perpendicular and coincides with the dry-bulb temperature line at 56°. Although not shown, for air velocities of 100 and 500 feet per minute, the effective temperature lines and the dry-bulb temperature lines coincide respectively at 51° and 59°.

For dry-bulb temperatures below these respective values, an increase in humidity produces a cooler sensation instead of a warmer sensation as is produced for dry-bulb temperatures above these values. Hence, these values may be called the dividing lines at which humidity has no effect upon the comfort of the body.

The psychrometric chart of Figure 2 for moving air, differs from the chart of Figure 1 for still air only in that the effective temperature lines for any particular degree do not intersect the dry-bulb and wet-bulb temperature lines at the same degree on the saturation or 100 per cent relative humidity curve, but are removed to the right so that the effective temperature for any particular dry and wet-bulb temperature is lower for moving air than it is for still air. The difference between the effective temperature for still air and for moving air, of any velocity, is the cooling effect resulting from that velocity.

Referring to the psychrometric chart in Figure 1, a dry-bulb temperature of 70° and a relative humidity of 35, produces an effective temperature of 65°. This is for still air. Referring to Figure 2, which is for air moving at the rate of 300 feet per minute, the same dry-bulb temperature and relative humidity produces an effective temperature of 60°, or a reduction of 5° resulting from a change in the air velocity.

For winter-time conditions in relatively cold climates, and for persons normally clothed and slightly active, extensive tests show that the comfort zone ranges from an effective temperature of 62° to an effective temperature of 69°.

That particular effective temperature at which a maximum number of people feel comfortable is called the comfort line. While at rest, 97 per cent of the people have been found to be comfortable at an effective temperature of 64° and this temperature is generally considered as the winter comfort line or optimum effective temperature. However, persons working at various rates are most comfortable at effective temperatures below 64°.

Since the main purpose of the comfort regulating device is to measure the human comfort, it follows that its functioning or principle of operation must be based upon a useful and practical relationship that combines the dry-bulb temperature, the relative humidity, and the air motion. From a study of the psychrometric charts of Figures 1 and 2, together with other psychrometric charts (not shown), I find that by reorganizing the foregoing values upon a different basis, a useful and practical relationship results. Such a relationship is shown in Figure 3.

Figure 3:
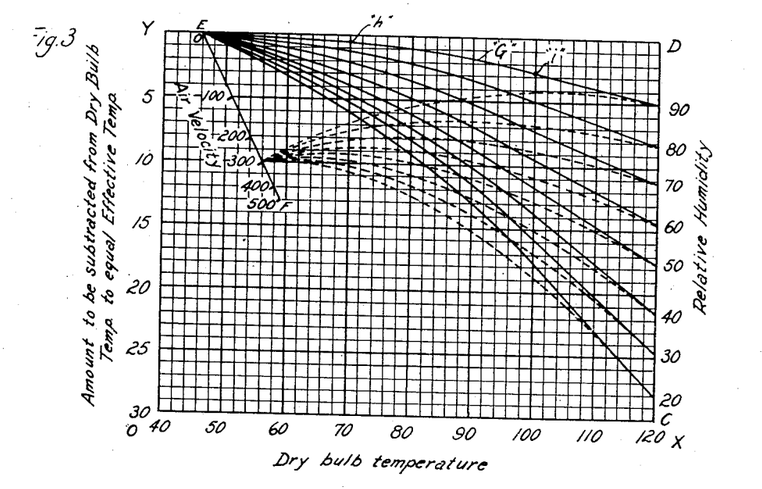
Figure 3 is a reorganized psychrometric chart and represents the basis for determining a measurement of the human comfort in all combinations of dry-bulb temperatures, relative humidities and air-velocities.

In Figure 3, the dry-bulb temperature is scaled off on the line OX; a subtra-hend value, that is the amount to be subtracted from the dry-bulb to equal the effective temperature, on the line OY; the relatively humidity, on the line CD; and the air velocities, on the line EF.

The air velocity line EF is determined as follows: With reference to the psychrometric chart of Figure 1, which is for still air, one observes that, at a dry-bulb temperature of 46°, the amount to be subtracted (the subtra-hend value) from the dry-bulb temperature to equal the effective temperature is zero. Therefore, the co-ordinates for establishing the zero point on the line EF are 46° for the dry-bulb temperature and zero for the subtra-hend value. Similarly, with reference to the psychrometric chart of Figure 2, which is for an air velocity of 300 feet per minute, one observes that, at a dry-bulb temperature of 56°, the amount to be subtracted from the dry-bulb temperature to equal the effective temperature, is 10°. This establishes the point 300 on the line EF. By referring to other psychrometric charts (not shown) the points for air velocities of 100, 200, 400 and 500 may be established in a similar manner.

The relative humidity line CD is likewise empirically established by first plotting a family of lines which have, for their origin, points on the air velocity line EF and which meet at a dry-bulb temperature of 120° F. The values for plotting the family of lines are obtained from the psychrometric charts of Figures 1 and 2, together with other similar charts (not shown). For instance, the line G inter-connecting the zero point on the line EF and the point 90 on the relative humidity line CD is determined by establishing a series of points, the values of which being obtained from the psychrometric chart of Figure 1, and drawing a line through the said points.

With reference to Figure 1, which is for still air, one observes that, at a dry-bulb temperature of 70° F. and a relative humidity of 90 percent, the effective temperature is 69.4. This means that, at a dry-bulb temperature of 70° F. and a relative humidity of 90 percent, the amount of a subtra-hend value to be subtracted from the dry-bulb temperature to equal the corresponding effective temperature is 0.6°. Therefore, with reference to Figure 3, a dry-bulb temperature of 70° F., as measured on the line OX, and a subtra-hend value of 0.6°, as measured off on the line OY, established a point h for the line G. For the point i on the line G, one observes from Figure 1 that, with a relative humidity of 90 percent, the subtra-hend value to be subtracted from a dry-bulb temperature of 100° F. to equal the corresponding effective temperature, is 2.5°. Other points for establishing the position of the line G may be determined in the same manner.

Figure 4:
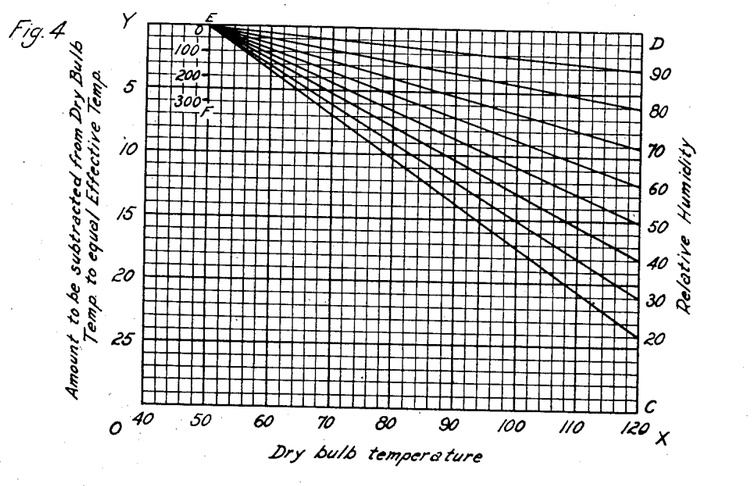
Figure 4 is a modified form of the family of full lines shown in the psychrometric chart of Figure 3, and represents the actual basis for the construction of my comfort regulating device.
Figure 5:
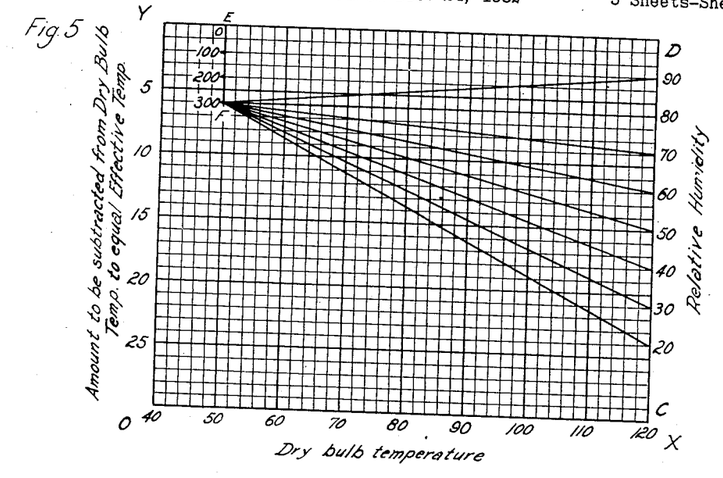
Figure 5 is a modified form of the family of broken lines shown in the psychrometric chart of Figure 3, and represents the actual basis for the construction of my comfort regulating device.

The other full lines of the family of lines, interconnecting the zero point on the air velocity line EF and the points 80, 70, 60, 50, 40, 30, and 20 on the relative humidity line CD, may be established in the same manner as the line G was established, except that relative humidities values of 80, 70, 60, 50, 40, 30 and 20 are, respectively, used for each line. In a similar manner the family of broken lines, inter-connecting the point 300 on the air velocity line EF and the points 90, 80, 70, 60, 50, 40, 30 and 20 on the relative humidity line CD, may be established, except that the values for establishing these lines are taken from the psychrometric chart in Figure 2 which is for an air velocity of 300 feet per minute. While I have drawn the foregoing family of lines to explain the method as to how they are established, it is readily apparent that an infinite number of such lines may be drawn. From the reorganized psychrometric chart of Figure 3, one observes that the corresponding lines in the various groups meet at 120° F. This indicates that at this high temperature, the air velocity has no cooling effect upon the body. Therefore, when the chart in Figure 3 is once established, one can obtain from it the amount (the subtra-hend value) to be subtracted from the dry-bulb temperature to equal the corresponding effective temperature for all possible combinations of dry-bulb temperature, relative humidities and air velocities. As will appear later the theory of operation of my comfort regulating device is primarily based upon the chart of Figure 3. However, before describing the structural features of my comfort regulating device, I will explain how the family of curved lines in the chart of Figure 3 may be modified or drawn straight to simplify and to facilitate the construction of my regulating device. Two modified psychrometric charts are shown in Figures 4 and 5. In order not to cause a confusion of the family of lines and to make the reconstruction of the modified psychrometric charts as clear as possible, I have preferably shown two charts. Figure 4 represents the modified form of the family of full lines of the psychrometric chart of Figure 3, and similarly Figure 5 represents the modified form of the family of broken lines.

The primary object of the modified psychrometric charts of Figures 4 and 5 is to so reconstruct the phychrometric chart of Figure 3 as to replace the family of curved lines by a family of straight lines, and at the same time so draw the family of straight lines that the scalar units of the air velocity line EF and the relative humidity line CD are uniform. To this end, the air velocity line EF is arbitrarily drawn vertically at a dry-bulb temperature of 50°. In Figures 4 and 5, the family of straight lines, throughout the working range of the dry-bulb temperature and the relative humidity, are so drawn that they coincide as nearly as possible with their respective curved lines of Figure 3, and it is immaterial whether or not the family of straight lines coincides with the family of curved lines outside of the working range. While the family of straight lines in Figures 4 and 5 are so drawn as to make them coincide as nearly as possible with the curved lines, they are also so drawn as to make the scalar units for the air velocity line EF and the relative humidity line CD uniform. Although the modified psychrometric chart in Figures 4 and 5 respectively illustrates a single family of lines originating from a point of zero air velocity and of 300 feet per minute, it is clearly manifest that an infinite number of straight lines may be drawn to represent all combinations of air velocities and relative humidities.

Figure 6:
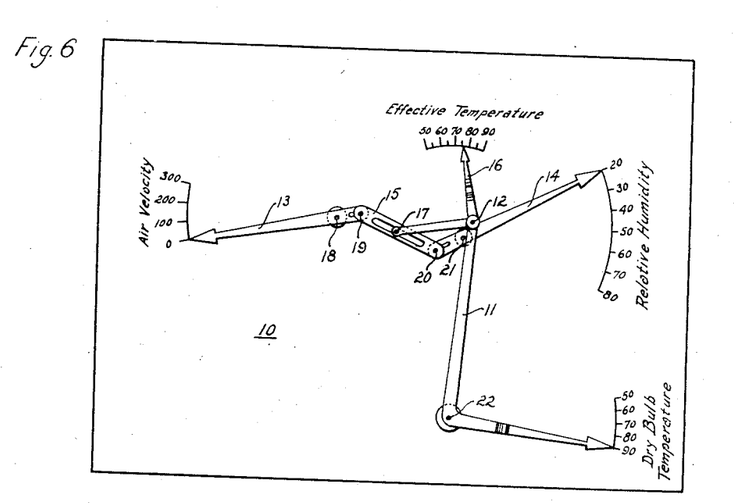
Figure 6 is an effective temperature indicator, having its principle of operation based upon the modified psychrometric charts shown in Figures 4 and 5.

With reference to Figure 6, I illustrate an effective temperature indicator having its mode of operation based upon the modified psychrometric charts of Figures 4 and 5. The indicator comprises, in general, a panel or base 10, an L-shaped dry-bulb temperature hand 11, an air velocity hand 13, a relative humidity hand 14, an L-shaped effective temperature hand 16, and an interconnecting link 15 having a slot substantially of its length. As illustrated, the dry-bulb temperature hand 11, may be pivotally connected to the base 10 by means of a pin 22, or other suitable means. Similarly, the air velocity hand 13 and the relative humidity hand 14, are pivotally connected to the base 10 by means of pins 18 and 21, respectively. The ends of the inter-connecting link 15, are pivotally and slidably connected to the inner ends of the air velocity hand 13 and the relative humidity hand 14 by means of pins 19 and 20, respectively. The openings in the inner ends of the air velocity hand 13 and the relative humidity hand 14, are somewhat elongated, thus forming relatively short slots to allow the two pivot pins 19 and 20 to slide therein as the two hands are actuated. As illustrated, the apex of the effective temperature hand 16, is pivotally connected to the upper end of the L-shaped dry-bulb temperature hand by means of a pin 12, and the left-hand end thereof is slidably connected to the slotted link 15 by means of a pin 17 that is disposed to slide freely, but not too loosely within the longitudinal slot of the interconnecting link 15.

The scalar units of the dry-bulb temperature scale, the relative humidity scale, and the air velocity scale are based upon the corresponding scalar units of the modified psychrometric charts in Figures 4 and 5. Hence, the actuation and setting of the dry-bulb temperature hand 11, at any particular value, causes the pivot point 12 to move substantially horizontally, thus representing a corresponding dry-bulb temperature value, as marked off on the scale OX of the modified psychrometric charts. Also, the actuation and setting of the relative humidity hand 14, at any particular value, causes the pin 20 to assume a corresponding relative humidity value, as marked off on the scale CD of the modified psychrometric charts, and the actuation and setting of the air velocity hand 13, at any particular value, causes the pivot point 19 to assume a corresponding air velocity value, as marked off on the scale EF of the modified psychrometric charts.

Therefore, for any particular setting of the relative humidity hand 14 and the air velocity hand 13, the inter-connecting link 15 assumes a position that corresponds to the position of a straight line drawn from a corresponding relative humidity value and a corresponding air velocity value, as scaled off upon the modified psychrometic charts of Figures 4 and 5. Accordingly, the illustrated linkage system is such that an increase in the setting of the relative humidity hand 14 causes the pin 20 to move upwardly, which, in turn, actuates the slidable pin 17 upwardly and the pointer of the effective temperature hand 16 to the right. Conversely, a decrease in the setting of the relative humidity hand 14 actuates the pointer of the effective temperature hand 16 to the left. In a similar manner, an increase in the setting of the air velocity hand 13 causes the pivot point 19 to move downwardly, which, in turn, actuates the slidable pin 17 downwardly and the pointer of the effective temperature hand 16 to the left. Conversely, a decrease in the setting of the air velocity hand 13 actuates the pointer of the effective hand to the right. From the foregoing, it is manifest that the linkage system is such that, for any particular setting of the dry-bulb temperature hand 11, the relative humidity hand 14, and the air velocity hand 13, the slidable pin 17 assumes such a position as to cause the pointer of the effective temperature hand 16 to be retracted by an amount equal to the subtrahend, as determined by the combined effect of the particular dry-bulb temperature, the relative humidity, and the air velocity. In other words, the three independent movements of the dry-bulb temperature hand 11, the relative humidity hand 14, and the air velocity hand 13, are translated into a single resultant movement of the effective temperature hand 16, which is a true indication of a person's feeling of comfort or discomfort. In the position of the hands as indicated in Figure 6, the dry-bulb temperature hand 11 is set at 90°, the relative humidity hand 14, at 20 percent, and the air velocity hand 13, at zero. With this setting, the effective temperature hand reads 76.8°, thus giving an effective temperature reading that is 13.2° below the corresponding dry-bulb temperature reading, and is accordingly, the true index of a person's feeling of comfort. For the illustrated setting, the subtrahend value is 13.2°.

From the foregoing, it is noted that the linkage system provides for giving a subtrahend value based upon the combined effect of the dry-bulb temperature, the relative humidity, and the air velocity, and for subtracting this subtrahend value from the dry-bulb temperature to give a measurement of the human comfort.

Having described the operation and principles of the effective temperature indicator, I will now describe how the same movements may be incorporated into a comfort regulating device for regulating the heating apparatus, or the cooling equipment to give the maximum degree of comfort.

Figure 7:
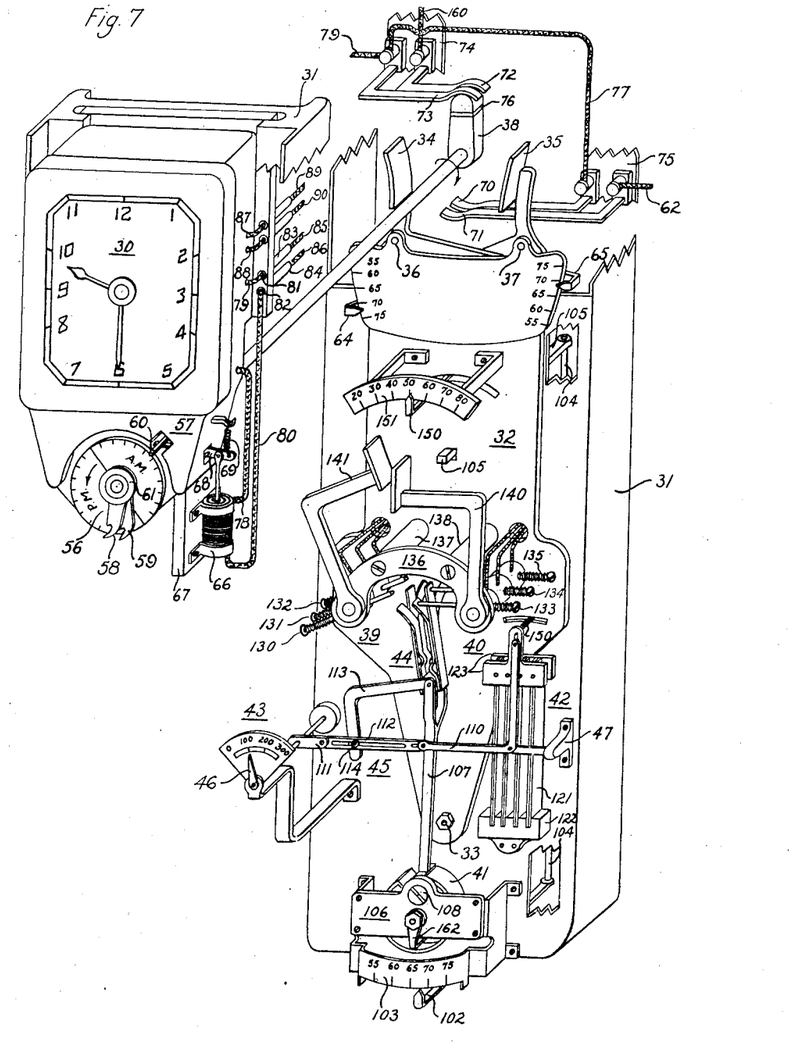
Figure 7 is a perspective view of my comfort regulating device.

With particular reference to Figure 7 of the drawings, my comfort regulating device comprises, in general, a clock 30 having a rear engaging flange slidably supported in a suitable groove of the upper part of a base 31, a shifting plate 32 pivotally connected to the base 31 by means of a bolt and nut 33 or other suitable means, two spaced, substantially upright members 34 and 35 pivotally connected to the upper end of the shifting plate 32, a cam 38 governed by the clock 30 for engaging the two upright members 34 and 35 and thereby actuating the shifting plate 32, two sets of contact pins 39 and 40 carried by the shifting plate 32, a circular bi-metallic element 41, a hygroscopic element 42, an air velocity hand 46 and an associated air velocity dial 43, a plurality of movable contact fingers 44, and a linkage system 45 for translating the movements of the bi-metallic element 41, the hygroscopic element 42, and the setting of the air velocity hand 46 into a single resultant movement of the movable contact fingers 44.

In the illustrated embodiment of my invention, I preferably show an electric clock of any suitable design, but it is to be understood that I do not intend to limit my invention to an electric clock, as clocks of other types may be likewise employed. Associated with the clock is a secondary dial 56 and a secondary mechanism 57 for actuating the cam 38. The combination of the clock, the secondary dial 56, the secondary mechanism 57 and the cam 38 constitutes a composite clock unit that is now utilized on existing thermostatic clock regulators. For this reason, the description and the drawings of the composite clock unit include only such main features as are necessary to explain the general mode of operation. The secondary dial 56 makes one complete revolution in twenty-four hours, and is divided in two main divisions, one designated as A. M. and the other as P. M. Each division is subdivided in twelve equal hourly divisions. Releasably attached to the secondary dial 56, are two tripping hands 58 and 59 for lifting a tripping lever 60, which, in turn, initiates the action of the secondary mechanism 57 to rotate the cam 38. As illustrated the two tripping hands 58 and 59 may be adjustably set for any desired tripping time by tightening a thumb set screw 61, and, when once set, they rotate in a counterclockwise direction with the secondary dial 56. As the arcuate ends of the tripping hands 58 and 59 respectively pass under the tripping lever 60, they gradually lift the tripping lever and thereby set the secondary mechanism in operation. In the position as shown, the set screw 61 is unloosened and the two tripping hands 58 and 59 are hanging loosely. As will appear later, the tripping hands 58 and 59 are loose when the comfort regulator is set to control the cooling equipment in the summer season. In the winter season when the heating apparatus is in operation the tripping hands 58 and 59 are adjustably set and tightened to rotate with the secondary dial 56.

The secondary mechanism 57 and the associated rotating cam 38 are located in rear of the secondary dial 56. Briefly, the operation of the secondary mechanism is such that by lifting the tripping lever 60, to its raised position, the cam 38 rotates in a clockwise direction approximated one-quarter of a turn in which position the tip of the cam is in readiness to engage the upright member 35, and that, when the tripping lever 60 is allowed to fall to its lower position, the cam 38 resumes its rotation in a clockwise direction until the tip of the cam is vertically downward, thus making a total sweep of one-half of a revolution. During the period of the second-quarter sweep of the cam, it engages the upright member 35 and actuates the shifting plate 32 to the right. Similarly, by again lifting the tripping lever 60 to its raised position the cam rotates in a clockwise direction approximately one-quarter of a revolution, in which position the tip of the cam is in readiness to engage the upright member 34, and then when the tripping lever 60 is allowed to fall to its lower position, the cam resumes its rotation in a clockwise direction until the tip of the cam is vertically upward, thus making a second total sweep of one-half of a revolution. During the period of the fourth-quarter sweep of the cam, it engages the upright member 34 and actuates the shifting plate 32 to the left. For the purpose of adjustably varying the amount of the shift of the shifting plate 32, the two uprights 34 and 35 are pivotally connected to the upper end of the shifting plate 32 and hence they may be adjustably set at any desired position by moving the integrally formed indicating arms 64 and 65 along their corresponding effective temperature scales, marked off on opposite side of the upper end of the shifting plate 32.

In addition to the composite clock unit now employed in existing thermostatic regulators, I provide a second means for lifting the tripping lever 60. This second means is utilized when my comfort regulator is connected to control the cooling equipment in the summer season and comprises, in general, an electro-magnet 66 mounted on a depending bracket 67, a lifting lever 68 pivotally connected to the covering of the secondary mechanism 57 and arranged to have its inner end engage the underneath side of the tripping lever 60, a spring 69 that normally biases the inner end of the lifting lever 68 downwardly to free the tripping lever 60, and two sets of contact fingers 70 and 71, and 72 and 73, respectively disposed to be bridged by the tip of the cam 38, which is insulated from the remaining portion of the cam by means of a suitable insulating member 76. The energization of the electro-magnet 66 pulls the outer end of the lifting lever 68 downwardly and thus causes the inner end thereof to lift the tripping lever 60 to its raised position, and conversely, the de-energization of the electro-magnet 66 allows the spring 69 to raise the outer end of the lifting lever 68 and thereby cause the inner end thereof to free the tripping lever 60. The operation of the cam 38, initiated by the electro-magnet 66, is the same as that previously described in connection with the secondary dial 56 and the associated tripping hands 58 and 59.

The two sets of contact fingers 70 and 71, 72 and 73, respectively are carried by two insulating pieces 74 and 75 fastened to a rear portion of the composite clock unit (not shown). As will appear later, under certain external conditions, the shunting of the sets of contact fingers 70 and 71, and 72 and 73 completes a circuit for energizing the electro-magnet 66. To this end, the contact fingers 70 and 73 are inter-connected by a conductor 77, the contact fingers 71 and 72 are respectively connected to an external circuit by conductors 62 and 160, and the contact finger 73 and the lower terminal of the winding of the electro-magnet 66 are respectively connected to a pair of contact points 81 and 82 embedded in the rear flange of the clock by means of conductors 79 and 80. The embedded contact points 81 and 82 are, in turn, respectively connected to two energized conductors 85 and 86 by means of two terminals 83 and 84 embedded in the base 31. Similarly, by an arrangement of another pair of contact points and terminals, the two conductors 87 and 88 that lead to the electric motor of the clock are respectively connected to two energized conductors 89 and 90. Although not shown, the conductors 62, 160 and 78, the latter being connected to the upper terminal of the electro-magnet 66, are arranged to be connected to an external circuit through means of contact points and terminals embedded in the opposite side of the rear flange of the clock 30. Therefore, when the clock is slidably disengaged from, or slidably engaged into, the upper end of the base 31, there is no necessity of disconnecting incoming and outgoing conductors. In order to show the embedded terminals as clearly as possible the surrounding portion of the base 31 has been cut away.

In my invention, the electro-magnet 66, and the two sets of contact fingers 70 and 71, and 72 and 73, respectively, and all of their associated elements constitute an addition to the composite clock unit employed in existing thermostatic regulators, and, accordingly, the new parts, as well as the old, are removed when the new composite clock, as illustrated in my invention, is removed from the base 31.

In addition to actuating automatically the shifting plate 32 by means of the cam 38, a second means comprising manually operated parts is provided. As illustrated, the second means includes, in general, an adjustable effective temperature indicating hand 102, an effective temperature scale 103, an upright shaft 104 suitably supported in the base 31, and an actuating arm 105 having one end connected to the upper end of the upright shaft 104 and having its other end inserted into a suitable opening in the shifting plate 32. Therefore by means of the foregoing arrangement, the actuation of the adjustable effective temperature hand 102 causes a corresponding shifting in the same direction of the shifting plate 32.

In my comfort regulating device, the linkage system 45 that transmits a single resultant movement to the movable contact fingers 44, is actuated by the combined movements of the bi-metallic member 41, the hygroscopic element 42, and the setting of the air velocity hand 46. The linkage system 45 is based upon the linkage system shown in Figure 6, and comprises an upright post 107 having its upper end pivotally connected to the contact fingers 44, and its lower end connected to the bi-metallic member 41, a crank 110 pivotally connected at its apex to a support 47 and actuated by the hygroscopic element 42, an arm 111 actuated by the setting of the air velocity hand 46, a slotted arm 112 actuated jointly by the crank 110 and the arm 111, and a member 113 for transmitting the movements of the slotted arm 112 to the contact fingers 44.

The stationary end of the bi-metallic member 41 is adjustably connected to a bracket plate 106. In order that the position of the upright post 107 may be varied, when making calibrated adjustments, an adjustment screw 108 is provided. In this manner, the mere turning of the adjustment screw 108 changes the initial position of the upright post 107 for any particular dry-bulb temperature. Responding to changes in dry-bulb temperatures, the upright post 107 moves back and forth in the same manner as the contact fingers of the existing thermostats move back and forth. The swinging of the upper end of the upright post 107 not only actuates the contact fingers 44, but also causes the pin 114 to slide back and forth in the longitudinal slot of the slotted arm 112. This means that the movements of the contact fingers 44 are responsive to the movements of the hygroscopic element 42 and the setting of the air velocity hand 46, as well as to the bi-metallic member 41.

While there are several existing hygroscopic elements responsive to moisture such, for example, as the human hair, cellulose materials, and ribbon paper, I have preferably shown a hygroscopic element 42 made up of dissimilar pieces of wood 121, which deflect, when subjected to a change of moisture, very much as a bi-metallic strip deflects when subjected to a change of temperature. The lower ends of the dissimilar pieces of wood 121 are embedded in a suitable stationary support 122 and the free upper ends are each pivotally connected to separate cross-pins extending between two side plates 123. Integrally connected to the front side plate is an upwardly extending arm having a slot therein to which the upper end of the crank 110 is slidably connected. While I have shown only four dissimilar pieces of wood 121, it is apparent that any number may be employed to give the desired force to actuate the crank 110. In this embodiment of my invention, the upper free ends of the dissimilar pieces of wood 121 are disposed to swing to the right with an increase in the relative humidity. Accordingly, with an increase in the relative humidity, the right-hand end of the slotted arm 112 is raised, and with a decrease in the relative humidity, the right-hand end of the slotted arm 112 is lowered. The up and down movements of the right-hand end of the slotted arm 112 are, in turn, transmitted to the contact fingers 44. In addition to the hygroscopic element 42 actuating the slotted arm 112, it operates a relative humidity indicating hand 150 which moves along a relative humidity scale 151.

The left-hand end of the slotted arm 112 is actuated up and down in accordance with the setting of the air velocity hand 46. As illustrated, with an increase in the setting of the air velocity hand 46, the left-hand end of the slotted arm 112 is actuated downwardly and conversely, with a decrease in the setting of the air velocity hand 46, the movement of the left-hand end of the slotted arm 112 is upwardly.

Therefore, by the linkage system 45, the movements of the bi-metallic member 45, and the hygroscopic element 42, and the setting of the air velocity hand 46, are transmitted into a single resultant movement of the contact fingers 44. In other words, the movement of the upper ends of the contact fingers 44, are a measurement of the effective temperature or the true index of a person's feeling of comfort or discomfort. Stated in another way, the contact fingers 44 lean backward from an extended line passing through the center of the upright post 107 by an amount equal to a subtrahend value, as determined by the combination of the dry-bulb temperature, the relative humidity and the setting of the air velocity.

The arrangement is such that the rate at which the moisture influences the action of the regulating device is greater at higher temperatures than at lower temperatures. This provision of causing the moisture to influence the action of the regulating device with the greater influence at higher temperature than at lower temperature is accomplished in the applicant's invention by means of the mechanical linkage comprising chiefly the slotted member 112 actuated at one end by a hygroscopic element 42 and at the other end by the air velocity adjusting means 43 taken in combination with the member 113 having its lower end slidably mounted by means of a pivot pin 114 within the longitudinal slot of the member 112. Therefore, it is noted that as the temperature increases, the pivot point 114 is moved to the right and thereby causes a greater movement in the set of contact fingers 44 with a unit change in the movement of the hygroscopic element 42. The importance of this provision may be readily observed by referring to the effective temperature lines in Figures 1 and 2 of the drawings. In these drawings, it is noted that at low temperatures, the effective temperature lines are substantially vertical, but that at higher temperatures, the effective temperature lines are inclined materially. Therefore, in order to give a true measurement of the effective temperature, there must be provisions to take care of the increasingly sloping effective temperature lines as the dry bulb temperature increases. Thus, with reference to Figure 1, observe that at an effective temperature of 85, a unit change in moisture from 10% relative humidity up to 20% relative humidity causes an increase of two units in the effective temperature, whereas at an effective temperature of 65, and with the same increase in relative humidity from 10% to 20%, there is less than one-half of a unit increase in the effective temperature. As above indicated, the applicant's invention takes care of this variable change in the sloping of the effective temperature lines by causing the thermostat member 107 to actuate the pivot point 114 to the right as shown in Figure 7, and thereby causes a unit change in moisture to affect the movement of the contact member 44 with a greater influence at higher temperatures than at lower temperatures.

As illustrated the contact fingers 44 are arranged to engage two sets of contact pins 39 and 40. As will appear later the set of contact pins 39 are used when my comfort regulating device is connected to control the heating apparatus in the winter season, and the set of contact pins 40 are used when my regulating device is connected to control the cooling equipment in the summer season. In this manner, regardless of whether or not my regulating device is connnected to control the heating apparatus or the cooling equipment, the closing of the control circuit by the contact fingers 44 engaging either one of the set of contact pins 39 or 40, accordingly initiates the action of the heating apparatus or the cooling equipment, and the breaking of the control circuit by the opening of the contact fingers with either one of the set of contact pins 39 or 40, accordingly arrests the action of the heating apparatus or the cooling equipment.

The set of contact pins 39 and 40 are similarly constructed and are mounted on the shifting plate 32 in the same manner. As shown, the set of contact pins 39 includes three contact pins 130, 131 and 132 and the set of contact pins 40 includes three contact pins 133, 134 and 135. The contact pins of each set threadably engage individual insulated cylindrical segments, which, when assembled, constitute a rotatable shaft suitably bearing on the rear end in the shifting plate 32 and on the front end in an arcuate member 136 that is rigidly connected to the shifting plate 32 by means of two supporting members 137 and 138. In order to prevent the two sets of contact fingers 39 and 40 from being in cooperative working position at the same time with the contact fingers 44, two interlocking arms 140 and 141 are respectively connected to the front end of each of the rotatable shafts into which the contact pins are threadably engaged. In the position as shown, being the position when my comfort regulating device is set to control the cooling equipment in the summer time, the set of contact pins 40 are in cooperative working position with the contact fingers 44, and the set of contact pins 39, which are connected to control the heating apparatus in the winter time, are rotated counterclockwise out of working engagement with the contact fingers 44. Therefore, before the interlocking arm 141 can be actuated in a clockwise direction to bring the set of contact pins 39 into working position with the contact fingers 44, it is first necessary to actuate the interlocking arm 140 in a clockwise direction and thereby raise the set of contact pins 40 out of working position with the contact fingers 44.

To avoid any unnecessary difficulty in adjusting the contact fingers 44, with reference to the two sets of contact pins, I provide two oppositely disposed sets of contact fingers. As illustrated, each set comprises three flexible fingers connected at their lower ends to a base that is pivotally connected to the upper end of the post 107 and adapted at their upper ends to engage the three corresponding contact pins. As will be more fully explained as the description advances, the three contact fingers are adjusted to progressively engage their respective contact pins.

While not shown, my comfort regulating device may be provided with a removable cover. In accordance with existing thermostatic regulators, such a cover may have the usual thermometer mounted thereon. In addition, the cover should be provided with suitable openings for the relative humidity scale 151, the air velocity scale 43, and the effective temperature scale 102, so that these readings may be visible and adjustable without removing the cover.

Figure 8:
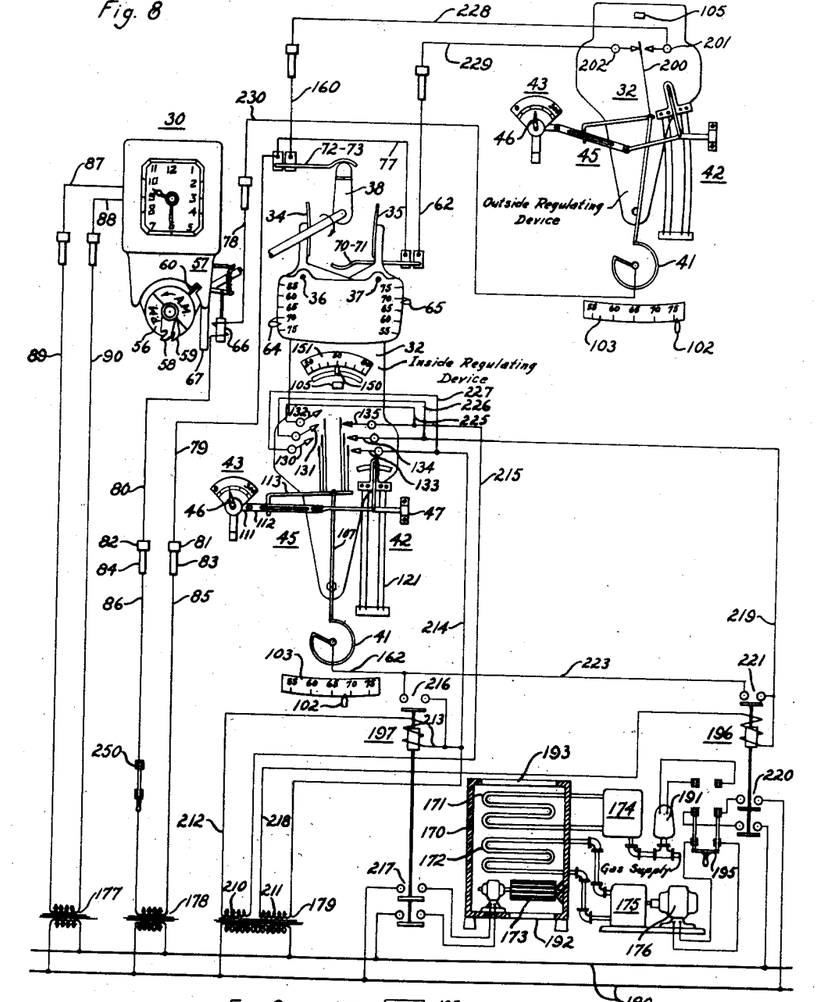
Figure 8 is a diagrammatic view of an air-conditioning system embodying the features of my invention and employing my comfort regulating device for regulating a heating apparatus, a cooling equipment and a fan to give the maximum degree of human comfort.

With reference to Figure 8, I illustrate how my comfort regulating device may be employed to control the heating apparatus in the winter season and the cooling equipment in the summer season. In general, the control system comprises an inside regulating device, that is mounted inside of a building, an outside regulating device that is mounted on the outside of the building, a compartment 170 including heating elements 171, cooling elements 172, and a motor-driven fan 173; a heat generating unit 174, a cooling unit 175 driven by a motor 176, transformers 177, 178 and 179, supply conductors 180, and associated relays and valves for effecting the desired operating characteristics.

The inside comfort regulating device, while it is drawn somewhat diagrammatically for simplicity and clarity, comprises and embodies the same features of the regulating device shown in Figure 7. The three flexible contact fingers of each set of the oppositely disposed contact fingers 44 are arranged to close progressively with approximately a two degree effective temperature differential between them. The two sets of contact fingers are constructed alike and, of the right-hand set that is connected to control the cooling equipment, the contact finger that engages the contact pin 135 (hereinafter called the right-rear contact finger) is adjusted to close first, the contact finger that engages the contact pin 133 (hereinafter called the right-front contact finger) is adjusted to close second, and the contact finger that engages the contact pin 134 (hereinafter called the right-middle contact finger) is adjusted to close last; and similarly of the left-hand set that is connected to control the heating apparatus, the contact finger that engages the contact pin 132 (hereinafter called the left-rear contact finger) is adjusted to close first, the contact finger that is adjusted to engage the contact pin 130 (hereinafter called the left-front contact finger) is adjusted to close second, and the contact finger that engages the contact pin 131 (hereinafter called the left-middle contact finger) is adjusted to close last.

For the outside regulating device, it is not necessary to include the clock and the associated features for automatically operating the shifting plate 32. The remaining parts, except for the single contact finger 200, are the same as the corresponding parts of the inside regulator.

As illustrated the transformer 177 supplies the energy to the electric clock 30 of the regulating device. The transformer 177 is designed to give the proper wattage and voltage to operate the electric clock and, therefore, no other circuit should be connected thereto.

The compartment 170 may be more descriptively referred to as the modern "air conditioners" and the outside of the enclosure may be finished to harmonize with any surroundings of the home, office, or other location. The upper heating elements 171 are connected to a heat generating unit 174 of the gas-burning type controlled by a suitable electro-magnetic gas valve 191. The lower cooling elements 172 of the air conditioner are connected to a refrigerating compressor 175 driven by a motor 176. As is usual practice, the motor-driven fan 173 is located in the bottom of the compartment 170 and provides, when running, for drawing a current of air from the room through the opening 192 in the bottom of the compartment and thence for forcing the air up through the compartment past the cooling elements 172 and the heating elements 170, and then out into the room through the opening 193 at the top of the compartment.

According as the conditions demand in the summer time, either the fan 173 or the cooling elements 172, or both may be operated; and in the winter time, either the fan 173 or the heating elements 171, or both may be operated. The selectivity between the cooling elements 172 and the heating elements 171 and the activity of the respective cooling and heating elements are controlled by the combination of a double-throw switch 195 and a relay 196, and the activity of the motor-driven fan 173 is controlled by a relay 197.

In explaining the operation, I will first assume that the system is set for summer time conditions. In the summer time position, which is the position shown in the drawings, the set of contact pins 133, 134 and 135 are in cooperative working position with the right-hand set of contact fingers 44 and the position of the double-throw switch 195 is down, thereby connecting the relay 196 to the motor that drives the refrigerating compressor 175. Further, for the purpose of making the description as clear as possible, the effective temperature hand 102 is arbitrarily set at a value of 68°, and the air velocity hand 46 at a value of 100 feet per minute. In actual practice, the effective temperature hand 102 should be set at such value that gives the maximum degree of comfort and the air velocity hand 46 should be set at such value that corresponds with the prevailing air velocity of the air in the room as caused by the fan 173. This value may be determined either by calculations based upon the capacity of the fan or by suitable anemometers at the time that the "air conditioners" are installed.

In the position of the flexible contact fingers, as shown, the control circuits are open; but, with an increase in the effective temperature of the air in the room or other surroundings, resulting from either a change in the moisture or the dry-bulb temperature, or the combination of them both, the flexible contact fingers gradually approach and progressively engage the set of contact fingers 133, 134 and 135. In this embodiment of this invention, the right-rear contact finger engages first at an effective temperature of 66° according to the arbitrary assumption; but, in so doing no current flows in the electrical circuits. However, at an effective temperature of 68°, by virtue of the differential of two degrees effective temperature between the contact fingers, the right-front contact finger makes contact with its cooperatively engaging contact pin 133, thereby establishes a circuit for energizing the relay 197 which, in turn, connects the motor that drives the fan 173 in circuit with the supply conductors 180. The circuit that energizes the relay 197 may be traced from the left-hand terminal of the secondary winding 210 of the transformer 179 through a conductor 212, the windings of the relay 197, conductors 213 and 214, the contact pins 133 and 135 bridged by the right-front and the right-rear contact fingers, and a conductor 215 to the right-hand terminal of the secondary winding 210 of the transformer 179. The operation of the relay 197 connects the motor that drives the fan 173 in circuit with the supply conductors 180 through the closing of the lower contact members 217. Just as soon as the upper contact member 216 of the relay 197 is closed, a holding circuit is established for continuously energizing the relay 197 so long as the right-rear contact finger engages the contact pin 135, even though the right-front contact finger breaks engagement with the contact pin 133. This holding circuit extends from the conductor 213 through the upper contact member 216, a conductor 162, the bi-metallic element 41, the post 107, right-rear contact finger, the contact pin 135, and the conductor 215 to the secondary winding 210 of the transformer 179. Therefore, by reason of the holding circuit together with the differential of two degrees effective temperature between the right-rear and the right-front contact fingers, the operation of the relay 197 is made positive and thus quick starting and stopping of the fan motor is prevented, even though the right-front contact finger, at the point where it just breaking away from the contact pin 133, should rapidly make and break contact with the contact pin 133. This means that the relay 197, when once energized, is not deenergized until the right-rear contact breaks engagement with the contact pin 135, which according to the arbitrary assumption would be at an effective temperature value of 66°, or in other words 2° below the 68°, the arbitrary setting of the effective temperature hand 102.

So far as explained, the motor driven fan 173 only is operating to cool the room and it alone will continue to operate so long as the effective temperature stays between a temperature bracket of 66° to 68°. Below this bracket, the motor-driven fan 173 is stopped.

Let it now be assumed that the effective temperature continues to rise above this temperature bracket. This increase in the effective temperature causes the contact fingers to swing further to the right and, at an effective temperature of 70° (a differential of two degrees above 68°), the right-middle contact finger engages the contact pin 134. This connection establishes a circuit for energizing the relay 196 and may be traced from the left-hand terminal of the secondary winding 211 of the transformer 179 through a conductor 218, the windings of the relay 196, a conductor 219, the contact fingers 134 and 133 bridged by the right-middle and the right-front contact fingers, and the conductor 214 to the left-hand terminal of the second winding 211 of the transformer 169. The operation of the relay 196 connects the motor 176 that drives the refrigerating compressor 175 in circuit with supply conductors 180 through the contact members 220 and the double-throw switch 195. In a similar manner as described in connection with the relay 197, just as soon as the upper contact member 221 of the relay 196 is closed, a holding circuit is established for continuously energizing the relay 196 so long as the right-front contact finger engages the contact pin 133, even though the right-middle contact finger breaks engagement with the contact pin 134. This holding circuit extends from the conductor 219 through the upper contact member 221, conductors 223 and 162, the bi-metallic element 41, the post 107, the right-front contact finger, the contact pin 133, and the conductor 214 to the left-hand terminal of the secondary winding 211 of the transformer 179. Therefore, by virtue of this holding circuit together with the differential of two degrees effective temperature between the right-front and the right-rear contact fingers, the operation of the relay 196 is made positive and thus quick starting and stopping of the motor 176 that drives the refrigerating compressor 175 is prevented, even though the right-middle contact finger, at the point where it is just breaking away from the contact pin 134, should rapidly make and break contact with the contact pin 134. This means that the relay 196, when once energized, is not deenergized until the right-front contact breaks engagement with the contact pin 133, which, according to the arbitrary assumption would be at an effective temperature value of 68°.

Summarizing the combined performance of the fan 173 and the refrigerating compressor 175, and using the arbitrarily chosen values, the fan with an increase of the effective temperature is started at an effective temperature of 68° and the refrigerating compressor 175 is started at an effective temperature of 70° and, with a decrease in the effective temperature, the refrigerating compressor 175 is stopped at an effective temperature of 68° and the fan is stopped at an effective temperature of 66°. In actual practice, the effect of the combined performance of the fan and the refrigerating compressor, as controlled by my comfort regulating device, may be divided in three operating conditions. Under the first condition, should the dry-bulb temperature be relatively low with the air dry, neither the fan nor the refrigerating compressor is operated; because, under the first conditions, the effective temperature is relatively low and consequently there is no necessity for cooling the room. Under the second condition, should the dry-bulb temperature be relatively high with the air dry, the fan only is operated; because under the second condition, the effective temperature is of a medium value, and generally the cooling effect produced by the fan alone when the air is dry is sufficient to maintain the desired human comfort. Under the third condition, should the dry-bulb temperature be relatively high with the air rather damp, both the fan and the refrigerating compressor are operated; because, under the third condition, the effective temperature is relatively high and it is necessary to use both the fan and the refrigerating compressor to keep the desired human comfort.

As hereinbefore pointed out in the description, when my comfort regulating device is connected to control the cooling equipment in the summer-time, the air velocity hand 46 is set at such value as to correspond to the prevailing air velocity of the room caused by the fan. Therefore, when the fan is operating, the resultant movement of the contact fingers is a correct measurement of the human comfort, and it is immaterial whether the resultant movement of the contact fingers is not a correct measurement of the human comfort, as it will be when the fan is not operating, because, under the condition when the fan is not operating, none of the contact fingers is engaging the contact pins.

In the illustrated embodiment of my invention, since the air velocity is maintained at some suitable constant value, the action or performance is such that, for any change in the dry-bulb temperature or the moisture which results in a change in the human comfort, a correction is made in the dry-bulb temperature to off-set the said initial change in the human comfort caused by the change in the dry-bulb temperature or the moisture. In other words, the moisture may vary uncontrolled, because the operation of my invention is such that a correction is made in the dry-bulb temperature to keep the effective temperature of the air of the room the same as the setting of the effective temperature hand 102. This feature or mode of operation makes my invention particularly adaptable to the modern "air conditioner" in which there is no provision for positively controlling the moisture.

While "air conditioners" provide for humidifying the air in the winter, and for dehumidifying the air in the summer, yet there is no provision for positively maintaining the moisture at some predetermined selected value. In other words, the moisture is allowed to vary uncontrolled. The same is true with hot air furnaces where moisture is added, in an uncontrolled manner, to the room by placing a supply of water in the path of the heated air. Therefore, in those cases in which the moisture is controlled it is necessary to have additional equipment, controlled by a hygroscopic element. In this expensive manner, the relative humidity as well as the dry-bulb temperature is controlled. However, with my invention it is not necessary to go to the additional expense of installing a special humidifying and dehumidifying apparatus, because a correction is made in the dry-bulb temperature to off-set any change in the moisture, with the result the effective temperature is maintained at the optimum comfort value. For instance, with reference to the psychrometric chart of Figure 1, suppose that the optimum effective temperature for summertime conditions is 68°. For this effective temperature and with a relative humidity of 70 percent, the dry-bulb temperature must be 70.5°. Now, with a decrease in the relative humidity to 25 percent, it is necessary, while maintaining the same effective temperature, to stop the refrigerating compressor and the fan until the dry-bulb temperature reaches 75.5°. This means that, at these particular values, a correction of 5 degrees is made in the dry-bulb temperature to off-set the change in the effective temperature caused by a reduction in the relative humidity from 70 percent to 25 percent. Accordingly a very efficient system results. As the motor for driving the fan and the motor for driving the refrigerating compressor are operated only when necessary. Also, efficiency is attained by operating the fan only during the lower part of the effective temperature bracket. From the foregoing, it is noted that, in view of the fact my comfort regulating device gives a measurement of human comfort that is responsive to the combination of the dry-bulb temperature, the moisture and a setting of the air velocity, a system results which not only is efficient but also requires no additional equipment to control the moisture.

In theatres and department stores, which are cooled artificially in warm weather, the contrast between the outdoor and indoor air conditions, becomes the deciding factor in regard to the most desirable effective temperature to be maintained in the inside of the building. The object of cooling theatres in the summer is not to reduce the effective temperature to the optimum value, but to maintain therein a reasonably comfortable effective temperature and at the same time to avoid sensations of chill or of intense heat in entering and leaving the building. The relationship between desirable indoor effective temperature in summer corresponding to various outdoor effective temperatures is given in the following table:

*Desirable indoor temperature in summer compared to outside temperature*

| Degrees outside | | | Degrees inside | | |
| --- | --- | --- | --- | --- | --- |
| D. B. | W. B. | E. T. | D. B. | W. B. | E. T. |
| 95 | 70 | 81 | 80 | 65.2 | 73.4 |
| 90 | 69 | 79 | 78 | 64.5 | 72.2 |
| 85 | 67 | 76.5 | 76.5 | 64 | 71.1 |
| 80 | 65.5 | 73.8 | 75 | 63.5 | 70.2 |
| 75 | 64 | 70.5 | 73.5 | 63 | 69.3 |
| 70 | 62 | 67 | 72 | 62.5 | 68.2 |

All of these values listed in the table, except those for the outside effective temperatures, were taken from a table appearing on page 82 of the 1931 edition of the American Society of Heating and Ventilating Engineer's Guide. The values appearing in the outside effective temperature column were taken from the psychrometric chart in Fig. 1, using the corresponding outside dry and wet bulb temperatures with the same number of grains of moisture per pound of dry air. It is noted that the higher the effective temperature on the outside, the higher the corresponding effective temperature on the inside. Therefore, from the foregoing, we observe that the control circuits which regulate the air conditioning equipment must be such as to respond to both the outside and inside effective temperatures.

This provision is accomplished by causing the outside regulating device to change the effective temperature setting of the inside regulating device. With reference to the foregoing inside-outside effective temperature table, it is noted by interpolation that an outside effective temperature of 78° calls for an inside effective temperature of 72°. For the purpose of explaining this feature of my invention, I have arbitrarily chosen these values as the dividing line. Hence, the inside comfort regulating device is automatically set at an effective temperature of 72° for all outside effective temperatures above 78°, and at an effective temperature of 68° for all outside effective temperatures below 76° (a differential of two degrees is allowed for the play of the contact finger 200 between the two contact pins 201 and 202 of the outside regulating device). As illustrated, the effective temperature hand 102 of the outside regulating device is set at 76°, being the effective temperature value at which the contact finger 200 first engages the contact pin 202.

In the illustrated position of the inside and the outside regulating devices, it is noted that the time is 9.30 A. M., that the setting of the indicating hand 65 which actuates the upright member 34 is at an effective temperature value of 68°, that the setting of the indicating hand 64 which actuates the upright member 35 is at an effective temperature value of 72°, that the cam 38 is vertical (which means that the shifting plate 32 has been actuated by the cam 38 during the preceding night, thus making the setting of the effective temperature hand 102 register 68°), and that the effective temperature of the outside air is 76° or less, since the contact finger 200 is engaging the contact finger 202. In actual operation, the foregoing positions will remain as such until the effective temperature of the outside air reaches 78° or above, which may, on a hot summer day be about noon time or before.

Let it be assumed that the effective temperature of the outside air reaches 78° or above. This increase in effective temperature causes the contact finger 200 to swing to the right and engage the contact pin 201 which, in turn, establishes a circuit for energizing the electromagnet 66 of the composite clock unit. This circuit may be traced from the left-hand terminal of the secondary winding of the transformer 178 through a switch 250, the conductor 86, the terminal 84 that is embedded in the base 31, the contact point 82 that is embedded in the rear flange of the clock 30, a conductor 80, the winding of the electro-magnet 66, a conductor 78, a terminal and a contact point that are embedded in the left-hand rear flange of the clock 30, a conductor 230, the bi-metallic element 41 of the outside regulating device, the contact finger 200, the contact pin 201, a conductor 228, a terminal and a contact point that are embedded in the left-hand rear flange of the clock 30, a conductor 160, the contact fingers 72 and 73 bridged by the tip of the cam 38, a conductor 79, a contact pin 81, a terminal 83, and a conductor 85 to the opposite terminal of the secondary winding of the transformer 178. The energization of the electro-magnet 66 by the establishment of the above traced circuit, lifts the tripping lever 60 to its raised position and thereby initiates the action of the secondary mechanism 57 for actuating the cam 38. Just as soon as the cam 38 breaks engagement with the contact fingers 72 and 73, the circuit that energizes the electro-magnet 66 is deenergized and, consequently, the tripping lever 66 is allowed to fall to its lower or normal position. As previously described, the operation of the tripping lever 60, causes the cam 38 to rotate in a clockwise direction and thus actuate the shifting plate 32 to the right. Since the previously assumed arbitrary setting of the indicating hand 64 is 72°, the automatic actuation of the shifting plate 32 by the cam 38 causes the pointer of the effective temperature hand 102 of the inside regulating device to move to the right until it likewise reads 72°. In the new shifted position of the shifting plate 32, because of the differential of two degrees effective temperature between the contact fingers, the fan 173, with an increase in the effective temperature, is started at an effective temperature of 72°, the refrigerating compressor 175 is started at an effective temperature of 74°; and, with a decrease in the effective temperature, the refrigerating compressor 175 is stopped at an effective temperature of 72°, and the fan 173 is stopped at an effective temperature of 70°.

This higher effective temperature setting of the inside regulating device is maintained until the effective temperature of the outside air decreases to or below 76°, at which value the contact finger 200 swings to the left and engages the contact pin 202. This establishes a circuit for energizing the electro-magnet 66 of the composite clock unit, and it may be traced from the left-hand terminal of the secondary winding of the transformer 178 through the switch 250, the conductor 86, the embedded contact terminal 84, the embedded contact point 82, the conductor 80, the winding of the electro-magnet 66, the conductor 78, the contact terminal and a point that are embedded in the rear left-hand flange of the clock 30, the conductor 230, the bi-metallic element 41, the contact finger 200, the contact pin 202, a conductor 229, a contact point and a terminal that are embedded in the rear left-hand flange of the clock 30, a conductor 62, the contact fingers 70 and 71 bridged by the tip of the cam 38, conductors 77 and 79, the embedded contact 81, the embedded terminal 83, and the conductor 85 to the opposite terminal of the secondary winding of the transformer 178. In a manner as previously explained, the energization of the electro-magnet 66 causes the cam 38 to rotate in a clockwise direction and thus actuate the shifting plate 32 back to its former setting. This is the setting as illustrated in the drawings.

Therefore, by means of automatically setting the inside regulating device in accordance with the outside regulating device, a reasonably comfortable effective temperature is maintained in the inside of the building and at the same time sensations of chill or of intense heat on entering and on leaving the building is avoided.

Figure 9:
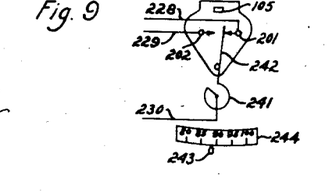
Figure 9 is a fragmentary showing of a thermostat which may replace the outside comfort regulating device shown in the upper right-hand corner of the control system in Figure 8.

While I preferably show an outside regulating device based upon the principles of my comfort regulating device, I also show in Fig. 9 that a straight thermostatic regulating device having a bi-metallic element 241 only may be employed instead of the outside regulating device shown in Fig. 8. For the regulating device in Fig. 9, the same circuit connections are used, but the scale 244 is calibrated in dry-bulb temperature. As illustrated the dry-bulb temperature hand 243 is arbitrarily set at 88°. Therefore for dry bulb temperatures of 90° and above (allowing for a differential of two degrees) the shifting plate 32 of the inside regulating device is shifted to the right, and for dry-bulb temperatures of 88° and below the shifting plate 32 is shifted to the left. As is observed, the swinging movements of the contact finger 200 of the outside regulating device of Fig. 8 is less than the swinging movements of the contact finger 242 of the straight thermostatic regulator of Fig. 9, and for this reason the contact finger 200 is not constrained to bend so much as the contact finger 242. This provision makes the outside regulating device shown in Fig. 8 preferable to the straight thermostatic regulator shown in Fig. 9.

The operation of my comfort regulating device for winter conditions will now be explained in connection with the fan and the heating apparatus. To change from summer time operating conditions to winter time operating conditions it is necessary to do four things. First, remove the cover from my comfort regulating device and actuate the interlocking levers 140 and 141, and thus raise the set of contact pins 40 out of cooperative working position with the right-hand set of contact fingers and lower the set of contact pins 39 into cooperative working position with the left-hand set of contact fingers. Second, actuate the double-throw switch 195 to the upper position. Third, open the knife switch 250. Fourth, adjustably set and clamp the two tripping hands 58 and 59 to the secondary dial 56 and reset the indicating hands 64 and 65. For winter time conditions the indicating hand 64 may be set at 66° effective temperature and the indicating hand 65 at 55° effective temperature. One of the tripping hands is set to cause the tripping lever 60 to be tripped in the P. M., say ten or eleven o'clock in the evening to reduce the effective temperature down to 55° (the setting of the indicating hand 65) during the night, and the other tripping hand is set to cause the tripping lever 60 to be tripped in the A. M., say five or six o'clock in the morning to have the rooms heated up to 66° effective temperature (the setting of the indicating hand 64) before getting up.

In explaining the operation, I will assume that the shifting plate 32 has just shifted in the morning to increase the effective temperature from 55° to 66°. Therefore, under this assumption, the left-hand set of contact fingers progressively engages the contact pins 132, 130 and 131, this being the order in which they are engaged. When the left-rear contact finger engages the contact pin 132, no current flows, but just as soon as the left-front contact finger engages the contact pin 130, a circuit is established for energizing the relay 197. This circuit may be traced from the left-hand terminal of the secondary winding 210 of the transformer 179 through the conductor 212, the winding of the relay 197, the conductors 214 and 227, the contact pins 130 and 132 bridged by the left-front and the left-rear contact fingers, and conductors 225 and 215 to the opposite terminal of the secondary winding 210 of the transformer 179. As previously described, the operation of the relay 197 connects the motor that drives the fan 173 to the supply conductors 180. Also, as the left-middle contact finger engages the contact pin 131, a circuit is established for energizing the relay 196. This circuit may be traced from the left-hand terminal of the secondary winding 211 of the transformer 179 through the conductor 218, the winding of the relay 196, the conductors 219 and 226, the contact pins 131 and 130 bridged by the left-middle and left-front contact fingers, and conductors 227 and 214 to the opposite terminal of the secondary winding 211 of the transformer 179. The operation of the relay 196 connects the electro-magnetic gas valve 191 in circuit with the supply conductors 180 and thus so regulates the fuel as to increase the effective temperature.

Thus, the fan and the heating apparatus both operate simultaneously. In this manner, the effective temperature of the building is increased to the optimum value in much less time than it would be if the fan were not employed. As the effective temperature increases, the contact fingers swing to the right and thus progressively break away from the contact pins 131, 130 and 132 in the order named. For explanation purposes, I will assume that the left-middle contact finger breaks away at an effective temperature of 64°, the left-front contact finger at an effective temperature of 66° (this is the value that coincides with the setting of the effective temperature hand 102) and the left-rear contact finger at an effective temperature of 68°. By virtue of the previously described holding circuits that are effected by the closure of the contact members 216 and 221 of the relays, the operation of the system is unaffected when the left-middle contact finger breaks engagement with the contact pin 131 at an effective temperature of 64°.

However, as the effective temperature increases to 66°, the left-front contact finger, according to the foregoing arbitrary assumption, breaks engagement with the contact pins 130 and thereby interrupts the circuit that energizes the relay 196. This interruption, in turn, arrests the action of the heating apparatus. The fan, however, continues to operate, and in the event that the effective temperature should rise to 68°, it is stopped, because at this arbitrary value the left-rear contact finger breaks engagement with the contact pin 132, and interrupts the circuit that energizes the relay 197. From the foregoing, it is noted that, when the shifting plate 32 shifts from a low setting to a high setting in the morning, both the heating apparatus and the fan in the beginning operate to increase rapidly the effective temperature; that as the effective temperature approaches and reaches the optimum value, namely the setting of the effective temperature hand 102, the heating apparatus is arrested, and that the fan in order to keep the air refreshed continues to operate until the effective temperature increases to 68°, at which value the relay 197 is deenergized.

Because of the differential of two degrees between the adjustment of the contact fingers, with a decrease in the effective temperature after the action of the heating apparatus is arrested, the contact fingers swing to the left and at an effective temperature of 64°, the left-middle contact finger re-engages the contact pin 131 and establishes the circuit for re-engaging the relay 196. This again starts the heating apparatus. Therefore, according to the arbitrarily assumed values the effective temperature is maintained between 64° and 66°.

In the evening, depending upon the P. M. setting, one of the specified tripping arms raises the tripping lever 60 and thereby causes the cam 38 as previously explained to actuate the shifting plate 32 to the lower effective temperature setting, as determined by the setting of the indicator 65. For this lower setting, the contact pins are shifted away from the contact fingers and accordingly both of the relays 196 and 197 are deenergized. This action causes the effective temperature to fall to the value of the lower setting.

It is apparent that, while I have illustrated my invention in connection with "air conditioners" the invention may likewise be readily adopted to regulate the damper of furnaces or perform any other operation that the existing thermostatic regulators perform. Also, inasmuch as the effective temperature is a measurement of any and all possible combinations of the dry-bulb temperature and the relative humidity (the air velocity being set at a constant value) my comfort regulating device may regulate either one of the two factors while the other one may be allowed to vary uncontrolled. As illustrated in the foregoing description, the dry-bulb temperature is regulated while the relative humidity may vary uncontrolled. It is likewise apparent that the reverse is true. That is my comfort regulating device may regulate the relative humidity while the dry-bulb temperature may vary uncontrolled.

Since certain changes in my invention may be made without departing from the spirit and scope thereof, it is intended that all matters contained in the foregoing description and shown in the accompanying drawings shall be interpreted as illustrative and not in a limiting sense.

I claim as my invention:

1. The combination with an apparatus for varying the temperature of air and a fan for distributing the air, of a regulating device having a plurality of engaging contacts, means responsive to both the moisture and the temperature for actuating the conacts, and circuit connections interconnecting at least one of the said plurality of engaging contacts with the temperature varying appaartus and interconnecting at least another one of said plurality of engaging contacts with the fan for individually operating the fan and the temperature varying apparatus in accordance with both the moisture and the temperature.

2. The combination with an apparatus for varying the temperature of air, of a regulating device having a plurality of sets of engaging contacts, one of said sets of contacts constituting a holding set, a relay having a holding circuit associated therewith, means for causing the relay to govern the temperature varying apparatus, means responsive to both the moisture and the temperature and having a regulating member receiving motion from each of said temperature and moisture means and resolving said motion into a resultant movement of its own for operating the contacts, the arrangement of the temperature means, the moisture means and the regulating member being such that the rate at which the moisture influences the movement of the regulating member is greater at higher temperatures than at lower temperatures, and circuit connections interconnecting the relay and its associated holding circuit with the contacts for operating the temperature varying apparatus in accordance with both the moisture and the temperature.

3. The combination with an apparatus for varying the temperature of air and a fan for distributing the air, of a regulating device having a plurality of progressively engaging contacts, means for actuating the contacts, a relay having an energizing and a holding circuit associated therewith for governing the operation of the fan, a second relay having an energizing and a holding circuit associated therewith for governing the operation of the temperature varying apparatus, and circuit connections for interconnecting the said relays with the progressively engaging contacts, said first energizing circuit being connected in circuit relation with at least two of said engaging contacts and said first holding circuit being connected in circuit relation with at least one of said two engaging contacts, and said second energizing circuit being connected in circuit relation with at least one of said two engaging contacts and with a third contact and said second holding circuit being connected in circuit relation with at least one of said two engaging contacts to cause said relays to govern the operation of the fan and the temperature varying apparatus in acordance with the movement of the said contacts.

4. The combination with an apparatus for varying the temperature of air and a fan for distributing the air, of a regulating device having a plurality of progressively engaging contacts, means for actuating the contacts, and circuit connection for interconnecting the fan with at least two of said engaging contacts, and circuit connections for interconnecting the temperature varying apparatus with at least one of said two engaging contacts and with a third contact, the arrangement of the contacts and the circuit connections being such that the action of the fan is initiated before the action of the temperature varying apparatus is initiated.

5. The combination with an apparatus for varying the temperature of air and a fan for distributing the air, of a regulating device having a plurality of progressively engaging contacts, means responsive to both the moisture and the temperature and having a regulating member receiving motion from each of said temperature and moisture means and resolving said motion into a resultant movement of its own for operating the contacts, the arrangement of the temperature means, the moisture means and the regulating member being such that the rate at which the moisture influences the movement of the regulating member is greater at higher temperatures than at lower temperatures, and circuit connection for interconnecting the fan and the apparatus for varying the temperature with the contacts, the arrangement of the contacts and the circuit connections being such that the action of the fan is initiated before the action of the temperature varying apparatus is initiated.

6. The combination with a cooling apparatus and a heating apparatus, of a plurality of contact fingers, means for actuating the contact fingers, a plurality of first contact members disposed on one side of the contact fingers and adapted to be engaged by the contact fingers when actuated in one direction, a plurality of second contact members disposed on the opposite side of the contact fingers and adapted to be engaged by the contact fingers when actuated in the other direction, a relay having a holding circuit associated therewith, selective means for connecting the relay in circuit relation with the cooling apparatus or the heating apparatus, and circuit connections for connecting the relay and its associated holding circuit with the contact fingers and with the plurality of first contact members and with the plurality of second contact members.

7. The combination with a cooling apparatus and a heating apparatus, of a plurality of contact fingers, means for actuating the contact fingers, a plurality of first contact members disposed on one side of the contact fingers and adapted to be engaged by the contact fingers when actuated in one direction, a plurality of second contact members disposed on the opposite side of the contact fingers and adapted to be engaged by the contact fingers when actuated in the other direction, a relay having a holding circuit associated therewith, selective means for connecting the relay in circuit relation with the cooling apparatus or the heating apparatus, circuit connections for connecting the relay and its associated holding circuit with the contact fingers and with the plurality of first contact members, and with the plurality of second contact members, and means for moving the plurality of contact members on either side of the contact fingers out of working engagement with the contact fingers.

8. In combination, an air conditioning apparatus having air modifying means, a first regulating device having first engaging contacts and means including a first thermostatic element for causing relative movement between the said first contacts, first circuit connections connected in circuit relation with the said first contacts and the air conditioning apparatus for regulating the operation of the said air conditioning apparatus, shiftable means for causing relative movement between the said first contacts in addition to the relative movement caused by the said first thermostatic element, a second regulating device having second engaging contacts and means including a second thermostatic element for causing relative movement between said second contacts, and second circuit connections connected in circuit relation with the said second engaging contacts and the shiftable means for causing the said additional relative movement between the first engaging contacts independent of the relative movement caused by the said first thermostatic element for modifying the operation of the said first engaging contacts and the said air conditioning apparatus.

9. In combination, an air conditioning apparatus having air modifying means, a first regulating device having first engaging contacts and means including a first thermostatic element and a first hygroscopic element for causing relative movement between the said first contacts, first circuit connections connected in circuit relation with the said first contacts and the air conditioning apparatus for regulating the operation of the said air conditioning apparatus, shiftable means for causing relative movement between the said first contacts in addition to the relative movement caused by the said first thermostatic element and said first hygroscopic element, a second regulating device having second engaging contacts and means including a second thermostatic element and a second hygroscopic element for causing relative movement between said second contacts, and second circuit connections connected in circuit relation with the said second engaging contacts and the shiftable means for causing the said additional relative movement between the first engaging contacts independent of the relative movement caused by the said first thermostatic element and the said first hygroscopic element for modifying the operation of the said first engaging contacts and the said air conditioning apparatus.

10. In combination, an air conditioning apparatus comprising air modifying means, a first effective temperature regulating device having means responsive to the dry bulb temperature and a relatively wide range of relative humidities for regulating the said air conditioning apparatus, circuit connections for interconnecting the first effective temperature regulating device and the said air conditioning apparatus for controlling the said air conditioning apparatus, and a second effective temperature regulating device having means responsive to the dry bulb temperature and a relatively wide range of relative humidities for modifying the operation of the first effective temperature regulating device and the said air conditioning apparatus.

11. In combination, an air conditioning apparatus comprising air modifying means, a first effective temperature regulating device having means responsive to the dry bulb temperature and a relatively wide range of relative humidities for regulating the said air conditioning apparatus, and a second effective temperature regulating device having means responsive to the dry bulb temperature and a relatively wide range of relative humidities for modifying the operation of the first effective temperature regulating device and the said air conditioning apparatus.

12. The combination with an apparatus for varying the dry bulb temperature of air and a fan for distributing the air, of a regulating device having a plurality of progressively engaging contacts, means responsive to both the moisture and the temperature for actuating the plurality of engaging contacts, and circuit connections interconnecting at least one of the said plurality of engaging contacts with the temperature varying apparatus and interconnecting at least another one of said plurality of engaging contacts with the fan for individually and progressively operating the fan and the temperature varying apparatus in accordance with both the moisture and the dry bulb temperature.

13. The combination with an apparatus for removing heat from the air and a fan for distributing the air, of a regulating device having a plurality of progressively engaging contacts, means responsive to both the moisture and the temperature for actuating the plurality of engaging contacts, and circuit connections interconnecting at least one of the said plurality of engaging contacts with the heat removing apparatus and interconnecting at least another one of said plurality of engaging contacts with the fan for individually and progressively operating the fan and the heat removing apparatus in accordance with both the moisture and the dry bulb temperature.

14. The combination with an apparatus for varying the dry bulb temperature of air and a fan for distributing the air, of a regulating device having means influenced by the dry bulb temperature and by the moisture and having a regulating member receiving motion from each of said dry bulb temperature means and said moisture means and resolving said motion into a resultant movement of its own for regulating the dry bulb temperature varying means and the fan, a plurality of progressively engaging contacts carried by the regulating member, and circuit connections interconnecting at least one of the said plurality of engaging contacts with the temperature varying apparatus and interconnecting at least another one of said plurality of engaging contacts with the fan for individually and progressively operating the fan and the temperature varying apparatus in accordance with both the moisture and the dry bulb temperature.

15. The combination with an apparatus for varying the dry bulb temperature of air and a fan for distributing the air, of a regulating device having means influenced by the dry bulb temperature and by the moisture and having a regulating member receiving motion from each of said dry bulb temperature means and said moisture means and resolving said motion into a resultant movement of its own for regulating the dry bulb temperature varying means and the fan, the arrangement of the dry bulb temperature means, the moisture means and the regulating member of the regulating device being such that the rate at which the moisture influences the movement of the regulating member is greater at high temperatures than at lower temperatures, a plurality of progressively engaging contacts carried by the regulating member and circuit connections interconnecting at least one of the said plurality of engaging contacts with the temperature varying apparatus and interconnecting at least another one of said plurality of engaging contacts with the fan for individually and progressively operating the fan and the temperature varying apparatus in accordance with both the moisture and the dry bulb temperature.

16. In combination, an air conditioning apparatus including means for removing heat from an enclosure and including a blower for establishing a stream of air to an inclosure, a refrigerating system associated with said means and including a cooling member in said means and a refrigerating compressor circulating refrigerant through said member, and a control device responsive to effective temperature for controlling the compressor at one effective temperature and controlling the blower at a relatively lower effective temperature.

17. The method of creating cooling sensations of persons within an enclosure which comprises, initiating a circulation of air in said enclosure when the effective temperature in said enclosure arises above a predetermined limit, and initiating cooling action on said air when the effective temperature in said enclosure rises above a second predetermined limit which is a higher value than the said first predetermined limit.

18. In combination with an enclosure, apparatus for conditioning air for said enclosure, a first effective temperature responsive device having means responsive to the dry bulb temperature and the humidity of air within said enclosure, and a second effective temperature regulating device having means responsive to the dry bulb temperature and the humidity of air outside said enclosure for modifying the operation of the first effective temperature regulating device and said apparatus.

19. The combination with apparatus for varying the dry bulb temperature, a regulating device therefor comprising means responsive to the dry bulb temperature, means responsive to the humidity, means for combining the responses of the responsive means so that the rate at which the moisture influences the action of the regulating device is greater at higher temperatures than at lower temperatures, and control circuits interconnecting the dry bulb temperature varying apparatus and the regulating device for so regulating the dry bulb temperature varying means that, for any unit change in the humidity at different dry bulb temperatures, the dry bulb temperature is corrected a variable amount to offset the change in the condition of the air caused by the change in the humidity.

20. In combination with an enclosure, air conditioning apparatus therefor comprising an evaporator, means for supplying refrigerant to said evaporator, and means for circulating air for said enclosure over said evaporator, an effective temperature regulating device for said refrigerant supplying means, comprising means responsive to the dry bulb temperature, means responsive to the humidity, means for combining the responses of the responsive means so that the rate at which the moisture influences the action of the regulating device is greater at higher temperatures than at lower temperatures and control circuits interconnecting said refrigerant supplying means and the regulating device for so regulating said refrigerant supplying means that, for any unit change in the humidity at different dry bulb temperatures, the dry bulb temperature is corrected a variable amount to offset the change in the condition of the air caused by the change in the humidity.

21. In combination with an enclosure, apparatus for conditioning air for said enclosure, a first effective temperature responsive device having means responsive to the dry bulb temperature and the humidity of air within said enclosure, a second effective temperature regulating device having means responsive to the dry bulb temperature and the humidity of air outside said enclosure, and means whereby both of said devices modify the operation of said apparatus for conditioning the air.

GEORGE V. WOODLING.